United States Patent [19]
Asano

[11] Patent Number: 5,253,121
[45] Date of Patent: Oct. 12, 1993

[54] RECORDING AND/OR REPRODUCING APPARATUS

[75] Inventor: Hisashi Asano, Tokyo, Japan

[73] Assignee: Sony Corporation, Tokyo, Japan

[21] Appl. No.: 735,870

[22] Filed: Jul. 25, 1991

[30] Foreign Application Priority Data

Jul. 31, 1990 [JP] Japan .................. 2-204573

[51] Int. Cl.$^5$ ............................................ G11B 5/02
[52] U.S. Cl. .......................... 360/19.1; 360/72.1; 360/73.06
[58] Field of Search ............ 360/19.1, 18, 72.2, 360/72.1, 73.06, 73.07

[56] References Cited

U.S. PATENT DOCUMENTS

| | | | |
|---|---|---|---|
| 4,228,471 | 10/1980 | Shiga | 360/73.06 |
| 4,340,916 | 7/1982 | Menezes | 360/72.2 |
| 4,656,536 | 4/1987 | Furumoto et al. | 360/72.2 |
| 4,688,116 | 8/1987 | Takahashi et al. | 360/72.2 |
| 4,716,558 | 12/1987 | Katayama et al. | 360/72.2 |
| 4,873,589 | 10/1989 | Inazawa et al. | 360/53 |
| 5,126,987 | 6/1992 | Shiba et al. | 360/72.2 |

*Primary Examiner*—Edward P. Westin
*Assistant Examiner*—Jon Santamauro
*Attorney, Agent, or Firm*—Lewis H. Eslinger; Jay H. Maioli

[57] ABSTRACT

In a recording and/or reproducing apparatus, a recording medium is reproduced for a predetermined period of time when it is detected by sequentially searching the record medium that date information recorded on the recording medium has changed at least a predetermined amount. A scan reproduction may be achieved in the form of information units, information units being different in point of recording time from each other.

6 Claims, 4 Drawing Sheets

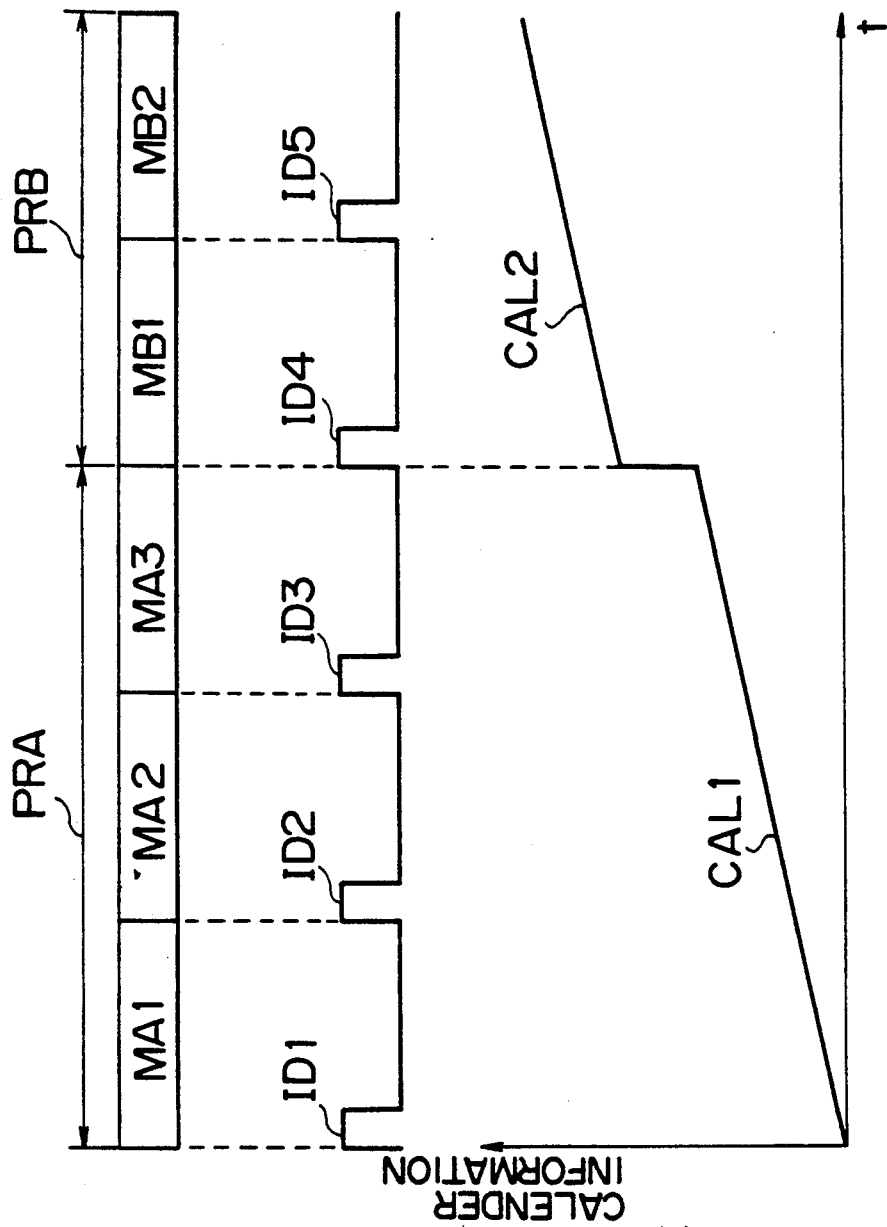

RECORDING AND/OR REPRODUCING APPARATUS

BACKGROUND OF THE INVENTION

The present invention relates to a recording and/or reproducing apparatus, and is suitably applied to a rotary head type digital audio tape recorder (DAT), for example.

On each of the recording tracks of a magnetic tape recorded in the conventional DAT format, there is formed a sub-data portion which records start information representing the heads of the pieces of music, program time, absolute time, calendar information, etc., in addition to a main data portion having the pieces of music or the like recorded by digital audio signals.

Practically, each piece of start information is recorded as data with logic "H" level in the head of each piece of music as a record unit for about 9 seconds. As the program time, relative elapsed time between pieces of start information with logic "H" level is recorded taking after-record editing into consideration.

As the absolute time, elapsed time from the head of the magnetic tape, for example, is recorded, and in the calendar information, the recording times are recorded as date and time information including year, month, day, hour, minute and second.

Here, the DAT has a music scan function: start information is searched by sequentially fast forward reproducing the magnetic tape from the head thereof; and the pieces of music are sequentially reproduced from the timing of detecting each piece of the start information only for a predetermined period of time (10 seconds, for example). Thus, the facility for the user is enhanced by reproducing and listening to sequentially only the head portions of all the music recordings in the magnetic tape.

However in the DAT it is necessary to correctly record the start information for the music scan function previously described. On the other hand, it is not possible to use the music scan function in music tapes which have no start information recorded on them.

For example, a magnetic tape may have programs, each of which consists of pieces of music, recorded on it. In such a case, the system is enhanced in utility by searching and reproducing heads of programs recorded on the magnetic tape. The music scan function previously described can merely scan all the music irrespective of the programs, and hence it is still insufficient in facility.

SUMMARY OF THE INVENTION

In view of the foregoing, an object of the present invention is to provide a recording and/or reproducing system which is capable of markedly improving facility for the user by performing scan reproduction in each of record information units which are different in record time using date information.

The foregoing objects and other objects of the present invention have been achieved by the provision of a recording and/or reproducing apparatus 1 which utilizes a recording medium 2 having date information CAL1 and CAL2 recorded in the whole areas, the date information representing times of record, the record medium 2 being played back for a predetermined period of time from a point of time when it is detected by sequentially searching the record medium 2 that the date information CAL2 has been changed from the immediately previous date information CAL1 by a predetermined value or more.

The record medium 2 is played back for the predetermined period of time from a point of time when it is detected by sequentially searching the record medium 2 that the date information CAL2 has changed by the predetermined value or more from the immediately previous date information CAL1, the date information CAL2 being recorded in the whole areas of the recording medium 2. This enables scan reproduction to be achieved in the unit of information unit PRA, PRB, information units being different in point of record time from each other.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 3A-3C are diagrammatic view illustrating the record pattern of the calendar information.

DETAILED DESCRIPTION OF THE INVENTION

Figure 1:
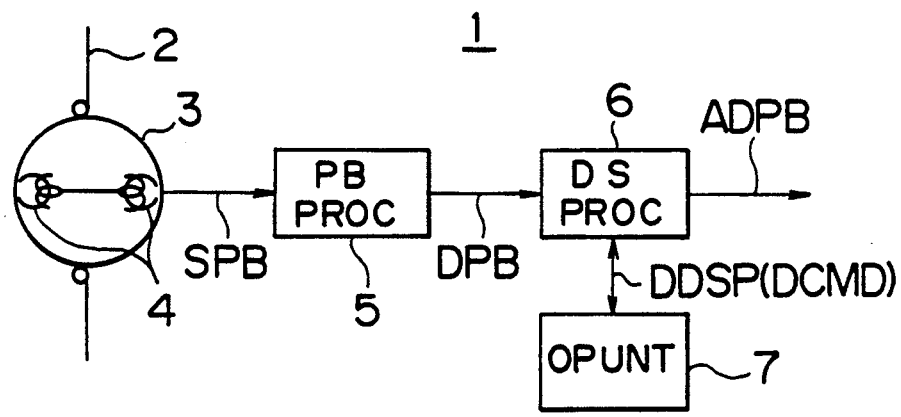
FIG. 1 is a block diagram illustrating one embodiment of the rotary head type audio tape recorder according to the present invention.

Preferred embodiments of this invention will be described with reference to the accompanying drawings:

In FIG. 1, 1 indicates a general configuration of a DAT according to the present invention, in which a magnetic tape 2 is wrapped over a drum 3. The audio data recorded on the magnetic tape 2 is read out by a rotary head 4 mounted to the drum 3, and is inputted as playback signals SPB to a playback signal processing circuit 5.

The playback signal processing circuit 5 includes a reproduction amplification circuit, an equalizer circuit, binarization circuit, etc., and read-out digital data DPB obtained by these components is inputted to a digital signal processing circuit 6.

The digital signal processing circuit 6 includes a central processing unit (CPU), a memory, a demodulation circuit, an error detection correction circuit, a digital-to-analog conversion circuit, etc., and demodulates the read out digital data DPB using the memory as well as performs error detection and correction. The resulting analog signals are outputted as reproduced audio signals ADPB to the outside.

Furthermore, the digital signal processing circuit 6 demodulates the sub-data portion contained in the read out digital data DPB, and thereby sends out display data DDSP representing start information, absolute time, program time, etc. to an operation unit 7.

Thus, it is possible to display the absolute time and the program time which have been read out on a display screen of a front emission fluorescent character display tube (FL-VFD), for example, arranged in the operation unit 7.

By operating a play button, record button, fast forward button, review button, pause button, or other keys arranged in the operation unit 7, command data DCMD which corresponds to the operated button is inputted to the digital signal processing circuit 6, and thereby the whole DAT 1 performs the operation, such as playback, record, fast forwarding, reversing, pause, and stop, in response to the operated button.

In the DAT 1 of this embodiment, the operation unit 7 is further provided with a music scan button and a date button. By simultaneously operating the music scan button and the play button the DAT 1 achieves the music scan processing. Furthermore, by simultaneously operating the music scan button, the date button and the play button, the DAT 1 performs the date music scan processing using the calendar information.

Figure 2:
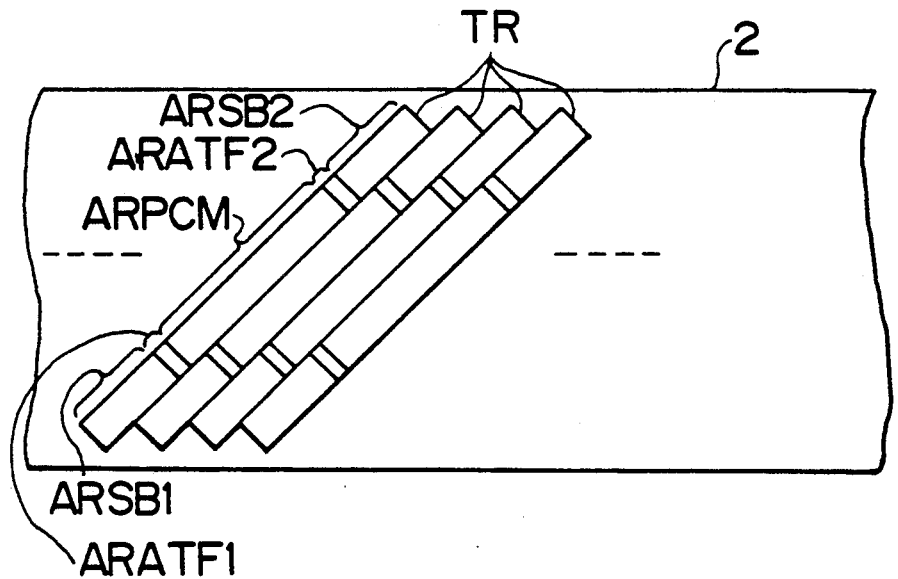
FIG. 2 is a diagrammatic view illustrating the record format of the magnetic tape.

Practically, as shown in FIG. 2 on the magnetic tape 2 record tracks TR are formed in a format: main data areas ARPCM each having audio data produced are centrally provided; the main data areas ARPCM are each provided at the front and rear thereof with first and second ATF record areas ARATF1 and ARATF2, respectively; and furthermore, externally of the ATF record areas ARATF1 and ARATF2 there are provided first and second subdata portion areas ARSB1 and ARSB2.

Here, as illustrated in FIG. 3, in subdata portion areas ARSB1 and ARSB2, pieces of start information ID1, ID2, ID3, ID4 and ID5 (FIG. 3B) are recorded as subdata in heads of music MA1, MA2, MA3, MB1 and MB2 (FIG. 3A), which are record units, for 9 seconds.

In addition to these, in the subdata portion area ARSB1, ARSB2 there is recorded sequentially as the subdata calendar information CAL1, CAL2 (FIG. 3C) which represents a time when the music MA1, MA2, MA3, MB1, MB2 is recorded on the magnetic tape 2.

In this case, the pieces of the music MA1, MA2 and MA3 are recorded as a first program PRA whereas the pieces of the music MB1 and MB2 are recorded as a second program PRB which is discontinuous to the first program PRA. As a result, a step of time is produced between the calendar information CAL1 of the music MA3 and the calendar information CAL2 of the music MB1.

Figure 4A:
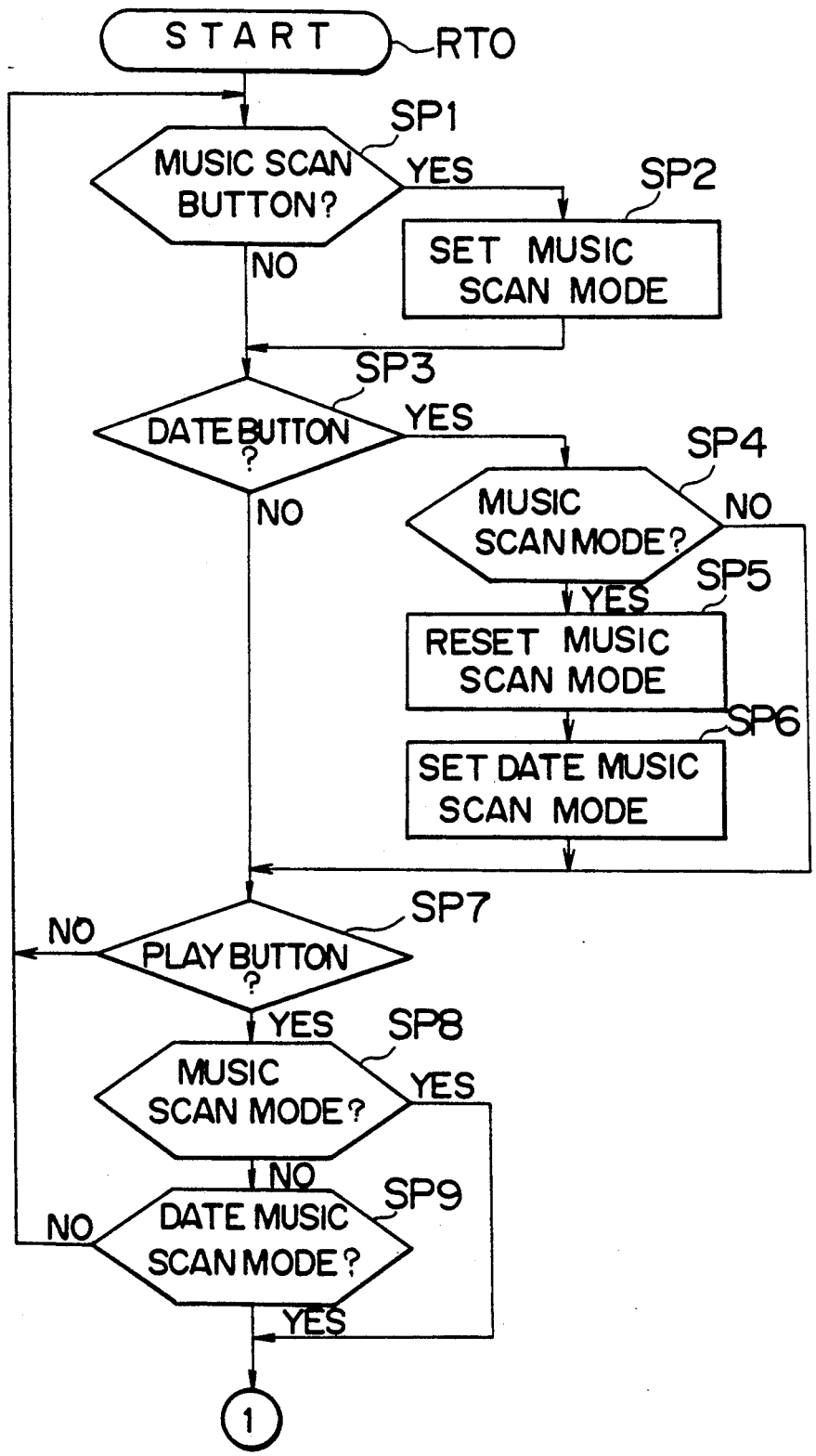
FIGS. 4A and 4B are flow charts showing the tape scan routine.
Figure 4B:
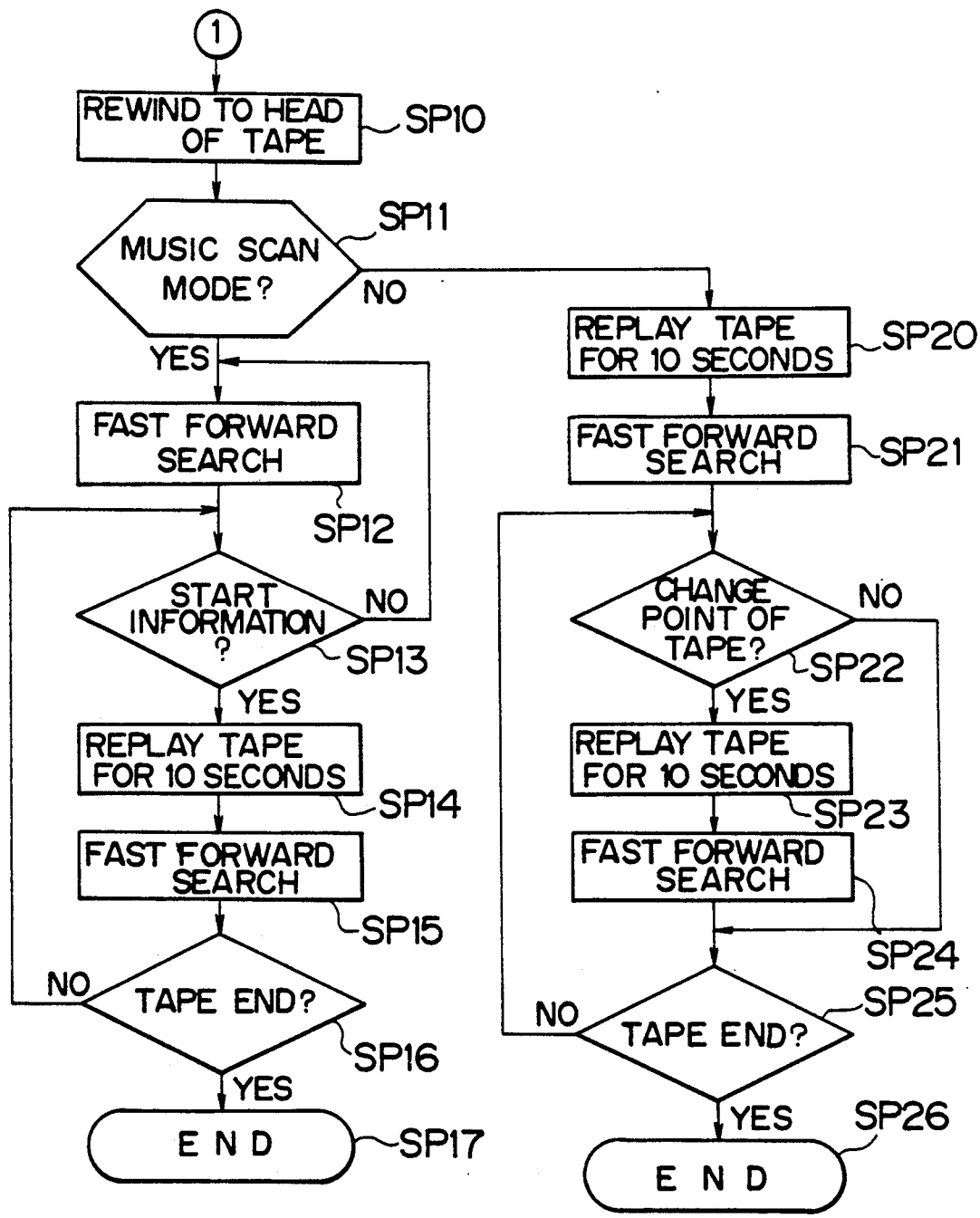

Here, when in this embodiment command data DCMD representing that the music scan button or the date button has been operated is inputted to the digital signal processing circuit 6 from the operation unit 7, the digital signal processing circuit 6 executes a tape scan routine RT0 shown in FIGS. 4A and 4B, so that a music scan processing using the start information or a date music scan processing using the calendar information is executed.

More specifically, the CPU of the digital signal processing circuit 6 enters the tape scan routine RT0, and then in the next step SP1 it judges whether or not the operated button is the music scan button.

When an affirmative result is obtained here, the CPU proceeds to the step SP2, where the music scan mode is set in the inner memory, and then, the CPU goes to the step SP3. On the contrary, when a negative result is obtained in the step SP1, the CPU directly goes to the step SP3.

In the step SP3, the CPU judges whether or not the operated button is the date button. When an affirmative result is obtained here, the CPU goes to the step SP4, where it makes a judgement as to whether or not it is in the music scan mode by referring to the inner memory.

When in this step SP4 an affirmative result is obtained, the CPU goes to the step SP5, in which the music scan mode of the inner memory is reset. In the subsequent step SP6 the date music scan mode is set, and then the CPU proceeds to the step SP7.

When on the contrary a negative result is obtained in the step SP3, the CPU directly goes to the step SP7, and also when in the step SP4 a negative result is obtained, it directly proceeds to the step SP7.

In this step SP7, the CPU judges whether or not the operated button is the play button. When an affirmative result is obtained here, the CPU goes to the step SP8, where with reference to the inner memory a judgement is made as to whether or not it is in the music scan mode.

When a negative result is obtained in this step SP8, the CPU goes to the step SP9 where with reference to the inner memory a judgement is made as to whether or not it is in the date music scan mode. When an affirmative result is obtained here, the CPU goes to the step SP10.

When the CPU obtains a negative result in the previously described step SP7 or SP9, it returns to the step SP1. When an affirmative result is obtained in the step SP8, the CPU goes to the step SP10.

In this manner, the CPU of the digital signal processing circuit 6 executes the steps SP1 to SP9 of the tape scan routine RT0 when the music scan button or the date button of the operation unit 7 is operated, and thereby it detects the buttons simultaneously operated. When the music scan button and the play button are substantially simultaneously operated, the music scan mode is set and the CPU goes to the step SP10.

When the music scan button, the date button and the play button are substantially simultaneously operated, the date music scan mode is set and the CPU proceeds to the step SP10.

In this step SP10, the CPU rewinds the magnetic tape 2 to the head. When this rewinding is finished, in the step SP11 the CPU judges whether or not it is in the music scan mode by referring to the inner memory. When an affirmative result is obtained here, the CPU goes to the step SP12, and starts the music scan processing using the start information ID.

More specifically, in the step SP12 the CPU executes a fast-forward search of the magnetic tape 2, and then in the next step SP13 it judges whether or not the searched information is the start information ID. When a negative result is obtained, the CPU returns to the step SP12. When on the contrary an affirmative result is obtained, the CPU goes to the step SP14.

In this step SP14, the CPU performs reproduction of the magnetic tape 2 for 10 seconds, and in the subsequent step SP15 executes a fast-forward search of the magnetic tape 2. Then, in the subsequent step SP16 it is judged whether or not the end of the tape is reached. When a negative result is obtained, the CPU returns to the step SP13. When on the contrary an affirmative result is obtained, the CPU goes to the step SP17, where the tape scan routine RT0 is finished.

When a negative result is obtained in the step SP11, the CPU goes to the step SP20, in which the date music scan processing is started using the calendar information CAL.

In the step SP20, the CPU performs reproduction of the magnetic tape 2 for only 10 seconds, and in the subsequent step SP21 executes a fast-forward search of the magnetic tape 2.

Then, in the step SP22 it is judged whether or not there is a change point of date.

Practically, the CPU refers to the calendar information CAL 2 and calculates the difference between the calendar information and the immediately previous calendar information CAL1. When this difference is equal to or larger than a predetermined value, an affirmative result is obtained and then the CPU goes to the step SP23.

In the step SP23, the CPU performs reproduction of the magnetic tape 2 for only 10 seconds, and then in the subsequent step SP24 executes a fast-forward search of the magnetic tape 2. Then, the CPU goes to the step SP25.

When a negative result is obtained in the step SP22, the CPU directly goes to the step SP25.

In the step SP25 the CPU judges whether or not the end of the tape is reached. When a negative result is obtained in the step SP25, the CPU returns to the step SP22. When on the contrary an affirmative result is obtained, the CPU goes to the step SP26, where the tape scan routine RT0 is completed.

When the user simultaneously operates the music scan button and the play button of the operation unit 7, the DAT1 executes the music scan processing using the start information ID, and thus the head portions of all the music MA1, MA2, MA3, MB1 and MB2 recorded on the magnetic tape 2 can be sequentially listened by scan reproduction on the basis of the start information.

When the user simultaneously operates the music scan button, the date button and the play button of the operation unit 7, the DAT1 executes the date music scan processing using the calendar information CAL, the head portion of the music MA1, MB1 of each program PRA, PRB recorded on the magnetic tape 2 can be sequentially listened to by scan reproduction on the basis of the start information.

In the foregoing construction, the magnetic tape 2 is reproduced for a predetermined period of time from a point of time when it is detected by fast-forward search of the magnetic tape 2 that the calendar information CAL2 recorded in the subdata portion areas ARSB1 and ARSB2 of the magnetic tape 2 has changed by the predetermined value or more from the immediately previous calendar information CAL1. This can realize a DAT which is capable of scan reproducing each of programs PRA, PRB different in record time, and enables facility for the user to be markedly enhanced.

In the embodiment previously described, it is stated that the present invention is applied to DAT but the present invention is not limited to this and may be widely applied to recording and/or reproducing systems which use record media having date information recorded on the whole areas of the recording tracks.

While the description set out above relates to the preferred embodiments of the invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A recording and/or reproducing apparatus utilizing a recording medium on which signals representing a plurality of music portions are recorded along with respective start information, the music portions being arranged in at least first and second program areas and having respective first and second date information, said first and second date information being representative of recording points of time when said first and second program areas are recorded on said recording medium, characterized int hat said recording and/or reproducing apparatus comprises:
    playback means for reproducing signals recorded on said recording medium;
    means for selecting a music scan operation or a date music scan operation;
    means for processing said second program area corresponding to said second date information during a predetermined period upon selecting said date music scan operation, in response to detecting that said first and second date information detected by sequentially searching said recording medium differ from each other by at least a predetermined amount.

2. A recording and/or reproducing apparatus according to claim 1 wherein, on searching said date information, said recording medium travels at higher speed than in normal reproduction of said program areas.

3. A recording and/or reproducing apparatus according to claim 1 wherein said recording medium comprises a magnetic tape.

4. A recording and/or reproducing apparatus utilizing a recording medium on which signals representing at least first, second and third main data and first, second and third date information are recorded, said first, second and third date information being representative of recording points of time when said first, second and third main data are recorded on said recording medium, characterized in that said recording and/or reproducing apparatus comprises:
    playback means for reproducing signals recorded on said recording medium;
    means for selecting a date music scan operation;
    means for processing said second main data corresponding to said second date information during a predetermined period upon selecting said date music scan operation, in response to detecting that said first and second date information detected by sequentially searching said recording medium differ from each other by at least a predetermined amount, and
    for thereafter reproducing said third main data corresponding to said third date information during a predetermined period, in response to detecting that said second and third date information detected by sequentially re-searching said recording medium after the end of the first reproduction differ from each other by at least a predetermined amount.

5. A recording and/or reproducing apparatus according to claim 7 wherein said searching and researching are executed in a fast-forward mode.

6. A recording and/or reproducing apparatus utilizing a recording medium on which at least first and second main data and first and second date information are recorded, said first and second date information being representative of recording points of time when said first and second main data are recorded on said recording medium, characterized in that said recording and/or reproducing apparatus comprises:
    signal processing means including a central processing unit for detecting respectively said first and second date information by sequentially searching said recording medium,
    and for outputting a detection signal only in case that the difference between said first and second date information obtained from said first detection means is equal to or greater than a predetermined value, and
    means for reproducing said second main data during a predetermined period corresponding to said second date information on the basis of the detection signal from said second detection means.

* * * * *

UNITED STATES PATENT AND TRADEMARK OFFICE
CERTIFICATE OF CORRECTION

PATENT NO. : 5,253,121
DATED : October 12, 1993
INVENTOR(S) : Hisashi Asano

It is certified that error appears in the above-indentified patent and that said Letters Patent is hereby corrected as shown below:

Col. 6, line 1, change "int hat" to --in that--

Signed and Sealed this

Fourth Day of June, 1996

Attest:

BRUCE LEHMAN

*Attesting Officer*  *Commissioner of Patents and Trademarks*